(12) United States Patent
Maslak

(10) Patent No.: US 11,233,740 B2
(45) Date of Patent: *Jan. 25, 2022

(54) SYSTEMS AND METHODS FOR ADJUSTING A CONGESTION WINDOW VALUE OF A CONTENT DELIVERY NETWORK

(71) Applicant: Level 3 Communications, LLC, Broomfield, CO (US)

(72) Inventor: Joelle T. Maslak, Golden, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/197,914

(22) Filed: Mar. 10, 2021

(65) Prior Publication Data

US 2021/0194812 A1    Jun. 24, 2021

Related U.S. Application Data

(63) Continuation of application No. 16/714,573, filed on Dec. 13, 2019, now Pat. No. 10,951,530, which is a
(Continued)

(51) Int. Cl.
*G06F 15/16* (2006.01)
*H04L 12/803* (2013.01)
(Continued)

(52) U.S. Cl.
CPC .......... *H04L 47/125* (2013.01); *H04L 47/225* (2013.01); *H04L 47/2416* (2013.01);
(Continued)

(58) Field of Classification Search
CPC . H04L 47/125; H04L 47/225; H04L 47/2416; H04L 47/27; H04L 67/2842; H04N 21/64738
(Continued)

(56) References Cited

U.S. PATENT DOCUMENTS 7,099,273 B2    8/2006  Ha
7,136,353 B2    11/2006 Ha
(Continued)

OTHER PUBLICATIONS

International Preliminary Reporton Patentability, dated Apr. 30, 2019, Int'l Appl. No. PCT/US17/054343, Int'l Filing Date Sep. 29, 2017; 8 pgs.
(Continued)

*Primary Examiner* — Alicia Baturay

(57) ABSTRACT

Aspects of the present disclosure involve systems, methods, computer program products, and the like, for controlling a congestion window (CWND) value of a communication session of a CDN. In particular, a content server may analyze a request to determine or receive an indication of the type of content being requested. The content server may then set the initial CWND based on the type of content being requested. For example, the content server may set a relatively high CWND value for requested content that is not particularly large, such as image files or text, so that the data of the content is received at the client device quickly. For larger files or files that a have a determined smaller urgency, the initial CWND may be set at a lower value to ensure that providing the data of the content does not congest the link between the devices.

15 Claims, 6 Drawing Sheets

Related U.S. Application Data continuation of application No. 15/720,371, filed on Sep. 29, 2017, now Pat. No. 10,511,533.

(60) Provisional application No. 62/414,463, filed on Oct. 28, 2016.

(51) Int. Cl.
  *H04L 12/815* (2013.01)
  *H04L 12/853* (2013.01)
  *H04L 12/807* (2013.01)
  *H04N 21/647* (2011.01)
  *H04L 29/08* (2006.01)

(52) U.S. Cl.
  CPC ....... *H04L 47/27* (2013.01); *H04N 21/64738* (2013.01); *H04L 67/2842* (2013.01)

(58) Field of Classification Search
  USPC ........................................................ 709/230
  See application file for complete search history.

(56) References Cited

U.S. PATENT DOCUMENTS

| | | | |
|---|---|---|---|
| 7,333,431 B2 | 2/2008 | Wen | |
| 7,609,640 B2 | 10/2009 | Ahuja | |
| 8,125,910 B2 | 2/2012 | Shimonishi | |
| 8,159,939 B1 | 4/2012 | Kaufman | |
| 8,447,837 B2 | 5/2013 | Devanneaux | |
| 9,118,623 B2 | 8/2015 | Devanneaux | |
| 9,191,151 B2 | 11/2015 | Luby | |
| 9,794,181 B2 | 10/2017 | Flores | |
| 10,043,137 B1 | 8/2018 | Jorgensen | |
| 10,044,466 B2 | 8/2018 | Schmidt | |
| 10,142,860 B2 | 11/2018 | Jain | |
| 10,511,533 B2 | 12/2019 | Maslak | |
| 10,951,530 B2 * | 3/2021 | Maslak | H04L 47/225 |
| 2004/0016000 A1 | 1/2004 | Zhang | |
| 2012/0271922 A1 | 10/2012 | Assouline | |
| 2014/0380113 A1 | 12/2014 | Luby | |
| 2016/0164785 A1 | 6/2016 | Flores | |
| 2018/0123959 A1 | 5/2018 | Maslak | |
| 2020/0120030 A1 | 4/2020 | Maslak | |

OTHER PUBLICATIONS

International Search Report dated Dec. 15, 2017, Int'l Appl. No. PCT/US17/054343, Int'l Filing Date Sep. 29, 2017; 3 pgs.
Written Opinion of the International Searching Authority dated Dec. 15, 2017, Int'l Appl. No. PCT/US17/054343, Int'l Filing Date Sep. 29, 2017; 6 pgs.

\* cited by examiner

SYSTEMS AND METHODS FOR ADJUSTING A CONGESTION WINDOW VALUE OF A CONTENT DELIVERY NETWORK

TECHNICAL FIELD

Aspects of the present disclosure generally relate to content delivery networks and more specifically to adjusting or setting a congestion window value for a transaction between a client device and a content server of the content delivery network for providing content to the client device.

BACKGROUND

Telecommunication or other types of computer networks provide for the transmission of information across some distance through terrestrial, wireless or satellite communication networks. Such communications may involve voice, data or multimedia information, among others. Typically, such networks include several servers or other resources from which the content or network services can be supplied to a requesting end user. Once a content server of the content delivery network (CDN) is selected to provide the requested content to a client device, a communication session is established between the devices to provide the content to the client. The communication session may include the exchange of information and/or data included in packets that aid the devices in effective communication. One such information used by the devices includes a congestion window value (otherwise known as the "CWND"). In general, the CWND is a state variable that limits the amount of data that can be sent by the transmitting device at any one time. This variable is often used to address congestion on the link between the two communicating devices and increase the efficiency of the network.

Network congestion occurs when sent packets from the source (the server) exceed what the destination (the user) or an intermediate network device can handle. For example, the destination or client device may include buffers that store the incoming data or information as the destination device attempts to process the data. In some instances, such as when data is sent to the receiving device at a rate that the receiving device cannot process fast enough, the buffers may fill up at the destination device. This can lead to congestion and packet loss, retransmissions, reduced data throughput, performance degradation, and even network collapse in extreme cases. In another example, network congestion may occur as several devices attempt to communicate over the same link such that packets are lost or slow to arrive at the destination device.

In some instances, the destination device may provide an indication of the rate at which data may be received. With this information, the content server sets an initial CWND and begins providing data packets of the requested content to the client device. In response, the client device transmits acknowledgement messages back to the content server indicating that the transmitting data packets are received. Through an analysis of the acknowledgement messages, the content server may adjust the CWND, higher if all of the data packets are correctly received at the client device or lower if not all of the data packets are received (which indicates congestion on the path between the devices). In this manner, the communicating devices utilize the CWND to control the rate of transmitted data and information to the client device in response to the congestion of the communication session.

Typically, the CWND is set by the content server to an initial default value that is global to the server or to a specific route through the network. However, the default value may either cause congestion on the path or may not be an efficient transmission rate to provide the content. For example, a default initial CWND that is too high may overload or congest the path between the devices, particularly if several communication sessions are utilizing the same path. In another example, a default initial CWND may be too cautious in providing the content to the client device, resulting in slow start-up times or loading times of the content at the client device.

SUMMARY

One implementation of the present disclosure may take the form of a method for servicing requests for content in a CDN. The method may include the operations of setting an initial congestion window (CWND) value for a communication session between the client device and the content server for providing information to the client device, receiving a request for content at a content server from a client device, the request comprising an identification of the content, obtaining a content type based on the identification of the content from a database of content information, and resetting an initial congestion window (CWND) value for a communication session between the client device and the content server based at least on the obtained content type from the database of content information.

Another implementation of the present disclosure may take the form of a content delivery network (CDN) networking device. The device may include at least one communication port receiving a request for content from a client device, the request comprising an identification of the content, a processing device, and computer-readable medium connected to the processing device configured to store information and instructions. The instructions, when executed, cause the processing device to set an initial congestion window (CWND) value for a communication session with the client device providing information to the client device, access a database of content information to determine a type of requested content based at least on the identification of the content received from the client device, and reset the initial CWND value for a communication session with the client device based at least on the content type from the database of content information. The instructions may also cause the processing device to provide a portion of the requested content to the client device over the at least one communication port based at least on the initial CWND.

Yet another implementation of the present disclosure may take the form of a content delivery network (CDN). The CDN may include a first content server configured to set a congestion window (CWND) value for a first communication session between the client device and the first content server, control the CWND value during a duration of the first communication session based at least on a detected congestion on a connection between the client device and the first content server, receive a request for CWND statistics from the client device comprising one or more controlled CWND values, and transmit the CWND statistics to the client device. The CDN may also include a second content server configured to receive a request for content at the second content server from the client device, the request comprising an identification of the content and the CWND statistics and set an initial CWND value for a second communication session between the client device and the second content server based at least on the received CWND statistics.

DETAILED DESCRIPTION

Aspects of the present disclosure involve systems, methods, computer program products, and the like, for controlling a congestion window (CWND) value of a communication session of a CDN. In one particular embodiment, a CWND value is set by a content server in response to receiving a request for content from a client device. In this embodiment, the content server may analyze the request to determine or receive an indication of the type of content being requested. The content server may then set the initial CWND based on the type of content being requested. For example, the content server may set a relatively high CWND value for requested content that is not particularly large, such as image files or text, so that the data of the content is received at the client device quickly. For larger files or files that are less urgent, the initial CWND may be set at a lower value to ensure that providing the data of the content does not congest the path between the devices. By utilizing the type of content being requested to determine the initial CWND, the CDN may respond to client demands and experiences that utilizing a default initial CWND cannot provide.

In another embodiment, the client device may provide information concerning a desired bit rate or transmission rate for a particular requested content file. The content server may, in turn, set the initial CWND for providing the content to the client device in response to the provided information. For example, the content server may receive a desired bit rate for streaming a video file at the client device. With this information, the content server may set an initial CWND that attempts to provide the content at the requested bit rate or transmission speed. Further, the content server may determine that, based on the received information and a measured congestion for the communication session, the content may not be provided to the client device at the requested or desired rate. In such as circumstance, the content server may notify the client device of the potential for congestion for the session through one or more messages transmitted to the client device.

In yet another embodiment, the content server may provide feedback information to the client device concerning the adjustment of the CWND over the time of the communication session. This information may be stored by the client device for use in other communication sessions with the CDN. For example, the CWND statistics may be provided to another content server of the CDN by the client device when establishing another communication session. The content server may utilize this information to set or control the CWND for the communication session. In this manner, the CWND statistics may provide a roadmap or indication of the performance capabilities of the client device to aid the content server in controlling the CWND for the communication session.

Figure 1:
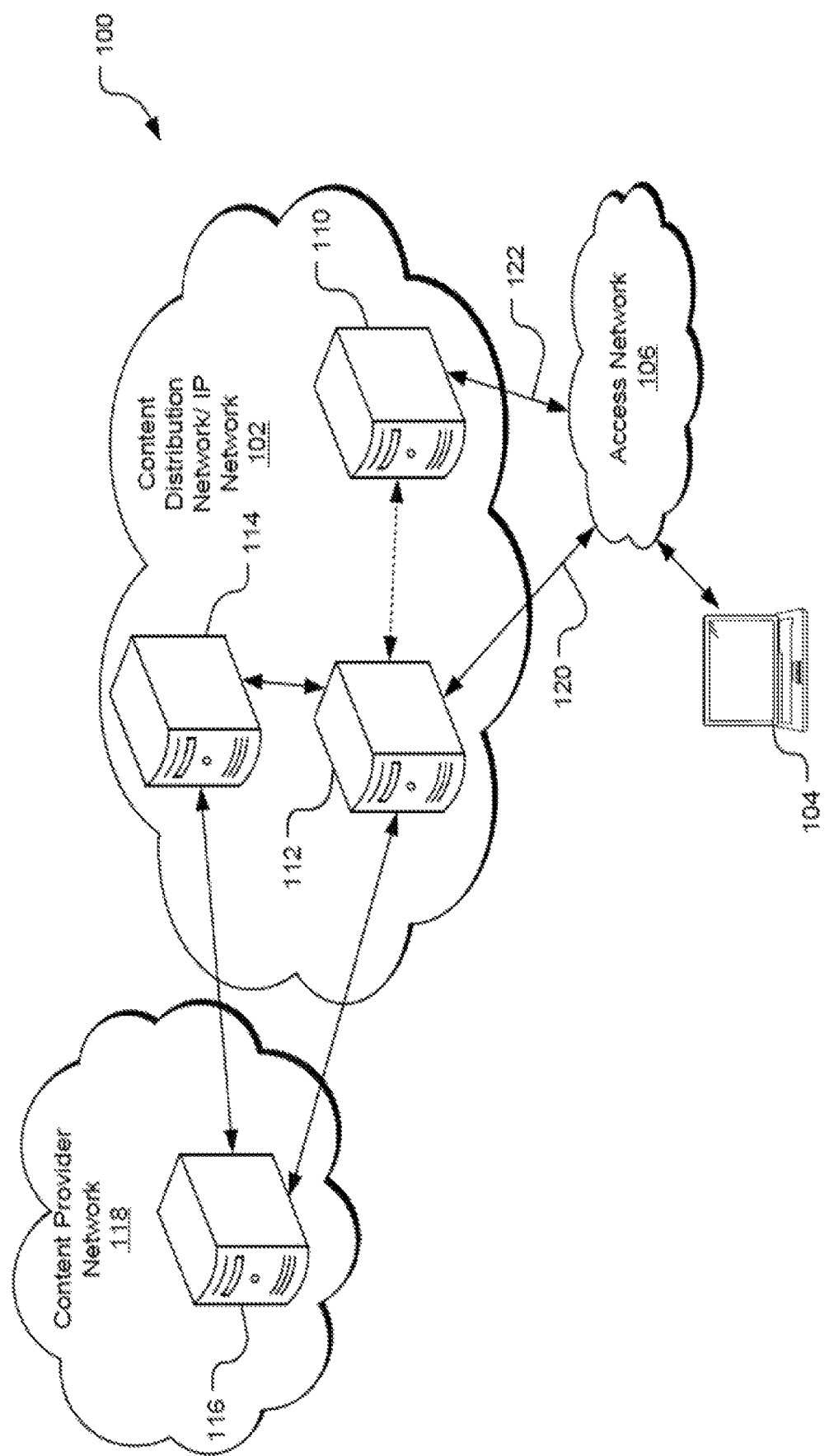
FIG. 1 is an example network environment for distributing content to an end user from a network, such as a content delivery network (CDN).

FIG. 1 is a network environment 100 for distributing content to one or more users. Although illustrated in FIG. 1 as a content delivery network, it should be appreciated that aspects of the present disclosure may apply to any type of telecommunications network that utilizes Internet Protocol (IP) addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks. In yet another embodiment, the user device 104 may be a component of access network 106.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, a user of the user computing device 104 enters a link name (e.g., URL or other identifier) into a browser executed on the computing device. The link name is associated with a network address within the CDN 102 at which the content may be obtained and provided to the computing device. For example, the user or the user device may enter a URL such as www.example.com/content into the browser of the computing device 104. Upon entering the URL, the hostname may be extracted by the browser (www.example.com in this particular case) and sends a request (possibly via an operating system running within the computing device 104) to a domain name server (DNS) associated with the user's access network 106.

Figure 2A:
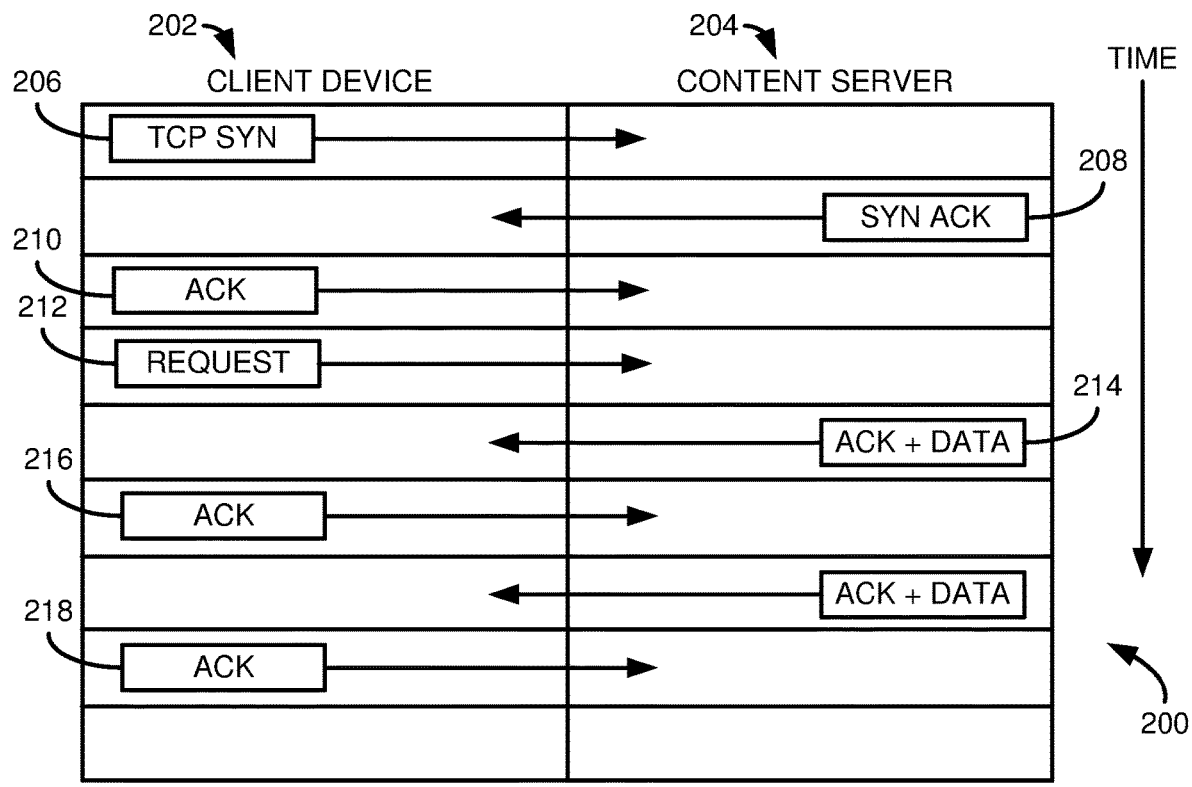
FIG. 2A is an example packet flow diagram for establishing a communication session between a client device and a content server.

Once a content server is selected, the client device 104 may connect to the selected content server 112 to begin receiving the content. In other words, the client device 104 utilizes the IP address of the content server 112 received from the DNS resolver 110 to establish a communication session with the content server to begin receiving the content. FIG. 2A is an example packet flow diagram for establishing a communication session between a client device 104 and a content server 112. The packets illustrated may be just a few of the packets that are transmitted between the devices to establish a communication session to transfer content to the client device 104. Other packets not shown or discussed may be exchanged, as will be understood by those of skill in the art.

FIG. 2A includes a left column 202 that includes the packets originating at the client device 104 that are transmitted to the content server 112. Similarly, a right column 204 includes packets originating at the content server 112 that are transmitted to the client device 104. The duration of the communication session is illustrated along the vertical axis of the graph 200 of FIG. 2A such that packets illustrated at the top of the graph are transmitted at the beginning of the communication session, followed by the packets moving down through the graph. Thus, after the client device 104 receives an IP address of the content server 112 (as provided by the CDN 102), the client device transmits a SYN (synchronize) packet 206 to the IP address of the content server. In one particular embodiment, the devices utilize a transmission control protocol (TCP) communication standard to communicate. However, it should be appreciated that the devices may utilize any communication standard to communicate and exchange communication packets.

In general, the SYN packet 206 instructs the content server 112 that the client device 104 intends on communicating. The content server 112 may, in response, transmit a SYN acknowledgement message 208 back to the client device 104 indicating that the content server is ready to communicate with the client device. Upon receiving the acknowledgement message 208, the client device 104 may transmit its own acknowledgement message 210 followed by a first request 212 for content from the content server 112. Further, the client device 104 may establish a maximum CWND value in the ACK message 210. In other words, the ACK message 210 includes a window size for content that the client device 104 is able to receive. Upon receipt at the content server 112, the initial CWND value for the communication session is established by the content server. Thus, the initial CWND is established prior to receiving any indication of the content being requested by the client device 104. In general, the initial CWND value is set by the content server 112 based on a default CWND value utilized by the content server for all or some communication sessions.

Once the request 212 for the data is received, the content server 112 returns an acknowledgement and the first portion of the content data 214 to the client device 104. The client device 104 responds with an ACK message 216 and requests the next packet of content data from the content server 112. In this manner, the client device 104 and the content server 112 may continue to exchange requests for data and the content data to provide the requested content to the client device. Further, as shown in FIG. 2B, the CWND value for the communication session may be adjusted by content server 112 to provide the content to the client device 104 at a faster rate to improve the performance of the CDN network 102.

Figure 2B:
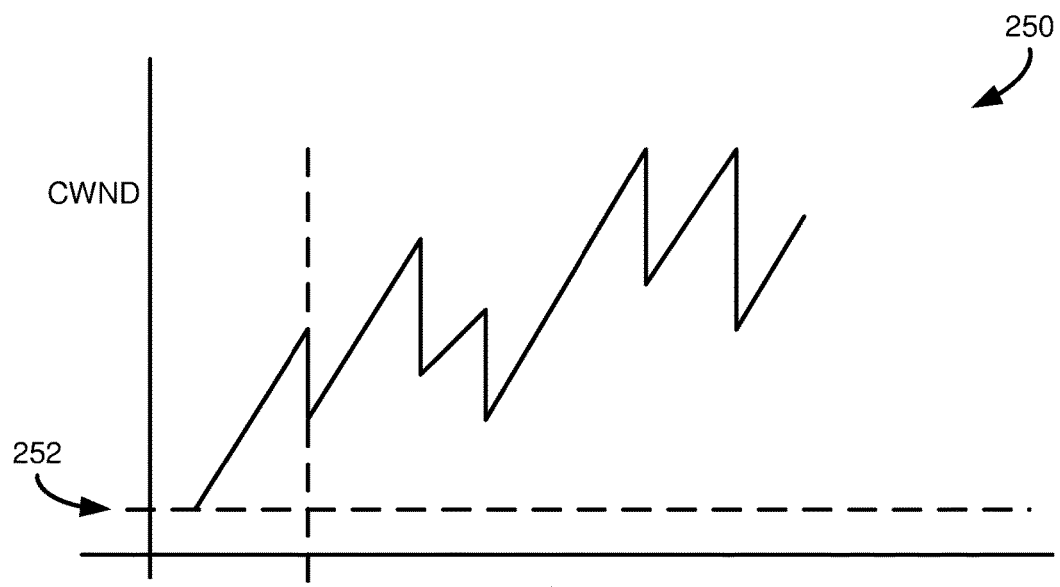
FIG. 2B is an example graph illustrating adjusting a congestion window value for the communication session of FIG. 2A over the life of the session.

In particular, FIG. 2B is an example graph illustrating adjusting a congestion window value for the communication session of FIG. 2A over the life of the session. In the graph 250, an example CWND value of a communication session between two networking devices is plotted over time (the CWND value plotted along the y-axis and time plotted along the x-axis). As shown, the CWND value for the communication session begins at an initial value 252. This initial value may be set by the content server 112 based on the acknowledgement message 210 described above. In other words, the content server 112 sets the initial CWND value that controls the rate that the content is transmitted to the client device 104. More particularly, the CWND value limits the amount of content data transmitted to the client device 104 before the content server receives an acknowledgement message from the client device that at least some of the transmitted content data is correctly received. Once an acknowledgement message is received by the content server 112, additional content data may be transmitted to the client device 104, again limited by the CWND value.

In some instances, the content server 112 and/or the client device 104 may adjust the CWND during the communication session. For example and as shown in the graph 250, the CWND value begins at the initial value 252 and is increased by the content server 112. The setting of the CWND at the initial value 252 may be set at a relatively low value to ensure that the client device 104 can adequately receive the content data and to avoid overloading the devices or transmission devices between the communicating devices. Further, the CWND value may be increased during the communication session to provide the content data at a faster rate to maximize providing the data to the client device 104.

At some point, one or more of the communicating devices may detect congestion between the devices. For example, the content server 112 may not receive the acknowledgement message from the client device 104 indicating that the client device has not received all of the transmitted content data because of the congestion. Once congestion is detected, the content server 112 (or client device 104) may adjust the CWND value down to slow down the transmission of content data to the client device, as shown in the graph 250 at time 254. At this time 254, the CWND for the session is adjusted down to ensure that the transmitted content data is received at the client device 104 through the detected congestion. The CWND value at time 254 may be any value determined by the content server 112, but may include a CWND value at which the acknowledgement message from the client device 104 is received.

Following the adjustment of the CWND in response to the congestion, the CWND value may again begin to be adjusted up to provide the content data at a faster rate. This may continue until congestion is again detected, at which point the CWND value is adjusted down. This process of increasing the CWND value for the session until congestion is detected may continue for the entirety of the communication session to provide the content data to the client device, resulting in the sawtooth pattern of the graph 250 of FIG. 2B. However, it should be appreciated that the CWND value of a communication session may be adjusted in any manner in response to a detected congestion between the communicating devices, including sharper or less increases, less sharp decreases, increasing or decreasing in a stepping manner, and the like.

Figure 3:
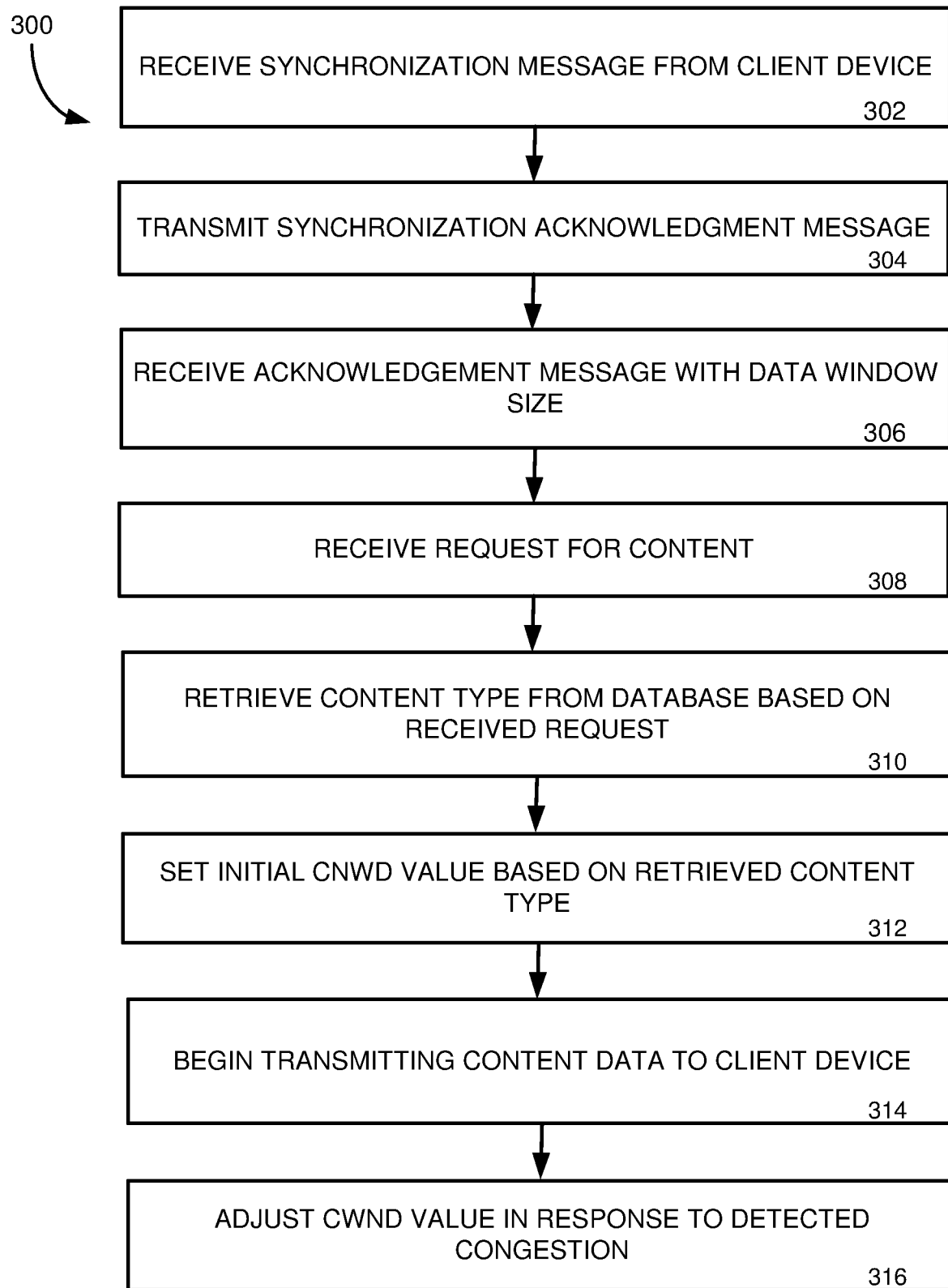
FIG. 3 is a flowchart of a method for setting an initial congestion window value for providing content to a client device based on the type of content requested.

The adjustment of the CWND value of a communication session may not, however, provide the most efficient method of providing the content data to the client device 104. In some instances, the adjustment of the CWND may increase the likelihood of congestion experienced by the devices and other devices utilizing the same network. To improve the operation and efficiency of a CDN and/or networking device, other mechanisms for setting and controlling a CWND value (or any other value that limits the rate of providing content to a requesting device) is now discussed. In particular, FIG. 3 is a flowchart of a method 300 for setting an initial congestion window value for providing content to a client device based on the type of content requested. In general, the operations of the method 300 may be performed by any networking device or combination of devices. In one particular implementation, the operations are performed by a content server providing content data to a client device based on a request for the content.

Beginning in operation 302, the content server receives a synchronization message to initiate or otherwise create a communication session with a requesting device. In one instance, the synchronization message is transmitted by a client device 104 to a content server 112 after the client device receives an IP address for the content server from a DNS of a CDN. The synchronization message may request synchronization utilizing any known or hereafter developed communication protocol, such as a TCP communication session. One example of a synchronization message is discussed above with relation to FIG. 2.

Also discussed above, the content server 112 may transmit a synchronization acknowledgement message in response to receiving the synchronization message in operation 304. Once the devices are synched, the content server receives an acknowledgement message with a window buffer size value of the client device in operation 306. This message with the window buffer size is also discussed above. However, rather than setting an initial CWND value for the session between the devices based on a default value for the content server, the content server may wait until a request for content data is received in operation 308. In general, the request for content data may include some type of identification of the content, such as a content file name. With the identifying information, the content server may determine a type of the requested content. For example, in operation 310, the content server may retrieve a content type from a database based on the identification of the requested content. Based on the content type, the content server may set the initial CWND in operation 312.

Content requested from and provided by the content server may include various types of content of various size files. For example, the requested content may be a simple thumbnail icon of a website of relatively small size up to a request for a high-definition video file of a relatively large size. Aspects or information about all or some of the content available from the content server may be stored and cataloged in a database of content files. In general, any information about the content available through the content server may be stored in the database. In one embodiment, the information about the content files is organized in the database based on a content identifier, such as a content file name. Once received, the content server may utilize the content file identifier to obtain the content information, including the file size.

With the content file information retrieved, the content server may set the initial CWND for the communication session accordingly. For example, the content server may determine that a small content file (such as a thumbnail icon) may be transmitted to the client device quickly without causing a large amount of congestion on the connection between the devices. In this example, the content server may set the CWND at a high value to get the content file to the client device quickly. In another example, the content server may determine that a large content file (such as a video file) may be transmitted to the client device slowly so as not to initially overwhelm the connection between the devices and cause undue congestion on the connection. Thus, the content server may set the CWND at a lower value to "test" the connection between the devices and ensure that providing the content will not overload the connection or the receiving device. The determination to set the initial CWND at a lower value may also be based on the length of time it will take to provide the entire content file. In other words, because it will take some time to provide the entire video file to the client device, there is time for the CWND value to be adjusted to account for congestion through the entire communication session. Smaller content files, like image files or text files, may be transmitted fully in a short amount of time such that it may be too cautious to set the initial CWND value low. In general, any consideration for providing the content file to the client device may be utilized by the content server when setting the initial CWND value based on the identification of the content file from the database. Other considerations are discussed in more detail below.

Regardless of the initial CWND value set by the content server, the server may wait until the request for the content and the identification of the content is received before setting the initial value. Once set, the content server may begin transmitting the content data to the client device based at least in part on the initial CWND value in operation 314. Further, in operation 316, the CWND value may be adjusted based on a determination of congestion in the communication session, as described above with relation to FIG. 2B. In this manner, the content server may set the initial value of the CWND based on a content type rather than to a default initial value.

Some transmission protocols, such as but not limited to, Transport Layer Security (TLS) may utilize an additional exchange of information (such as encryption key exchange) prior to the transmission of the request. In these protocols that utilize an additional exchange, an interim initial CWND may be chosen to facilitate this exchange and may be reset at the time of the request based on any of the methods described herein for setting the initial CWND. For simplicity, this is still referred to herein as the initial CWND. Further, multiple requests may occur serially in a single protocol connection. For example, a single session between a client device and a content server may include requests for several types of content, such as requests for images, requests for text, requests for videos, etc. to present a webpage to a user of the client device. In these instances, the congestion window may be reset as described for the initial CWND when a new request is received over the existing connection. For simplicity, this is also referred to herein as the initial CWND.

As mentioned, there may be various considerations for setting the initial CWND value based on the identification of the requested content by the content server. For example and as mentioned above, a larger file may have time during the communication session to find the proper window size to provide the content in the most efficient manner to the client device without causing undue congestion on the network. However, smaller content files may not have enough time to locate the most efficient window size for content data. Further, because the content file size is small, the entire file may be provided with little interruption to the network such that the smaller content file may be provided faster to a requesting device than previous CWND setting schemes. This provides a more pleasant experience for a requester of content as the content may be received faster.

In another example, the content server may consider the time sensitivity of the content file when setting the initial CWND value. For example, based on the content identifier and information stored in the database, the content server may determine that the content file does not need to be provided at an optimum speed to the client device. This may be the case for content files that are being downloaded, but will be experienced by a user of the client device at a later time, such as downloading computer software updates or entertainment files that will be experienced at a later time. In contrast, content files that are deemed to be time-sensitive may have an initial higher CWND value to ensure that the content file is provided as fast as possible on the network without disruption of the operations of the network. In a similar manner, the adjustment of the CWND value over the duration of the communication session may be also based on the content file information stored in the database. For example, a less time-sensitive file may be adjusted upward more slowly than a content file that should be received at the client device as soon as possible by the network. In general, the setting and control of the CWND value may be based on any information in the database and for any business or efficiency rule of the network as determined by an administrator of the telecommunications network.

Figure 4:
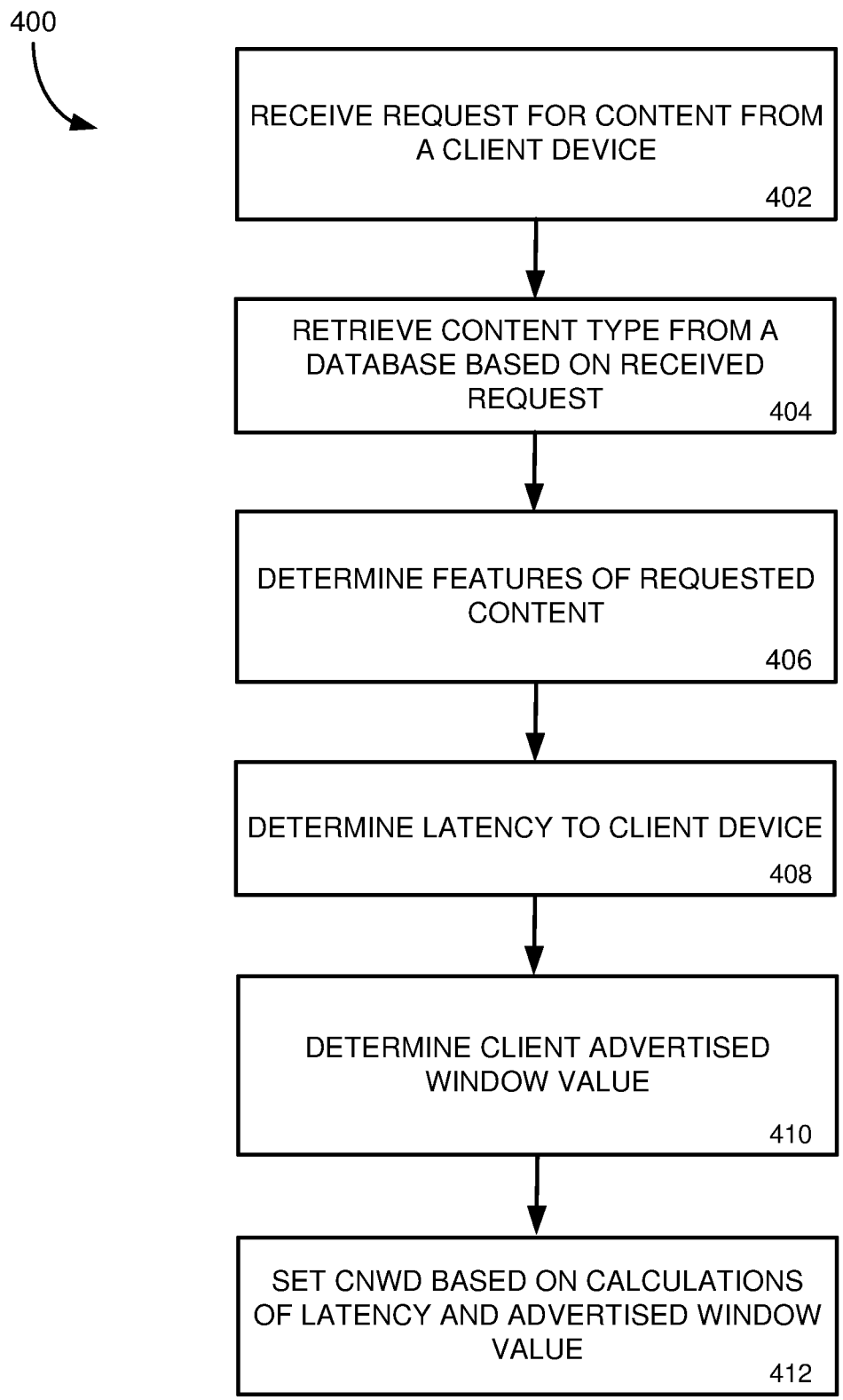
FIG. 4 is a flowchart of a method for providing congestion window value statistics to a client device for use in other requests for content from a content delivery network.

In still another embodiment, the content server may obtain information about the performance capabilities of the client device and/or the requested content and set or control the CWND value accordingly. For example, FIG. 4 is a flowchart of a method 400 for providing congestion window value statistics to a client device for use in other requests for content from a content delivery network. Similar to above, the operations of the method 400 of FIG. 4 may be performed by a content server, any networking devices, and/or collection of networking devices.

Beginning in operation 402, the content server receives the request for content from a client device and, in operation 404, retrieves the content type from the database, as explained above. In operation 406, the content server may determine a feature of the requested content type. For example, the request received at the content server may be for a streaming live video feed to be provided to the client device. In some instances, the live video feed may include high definition video and/or audio. The particular features of the requested content may be stored and accessible through the content type database described above. With the content information obtained, the content server may determine the rate at which the content data should be provided to the client device to maintain the particular features of the content file.

In operation 408, the content server may determine a latency value in providing data to the client device over the network connection. This latency value may be determined at the client device by comparing a timestamp included in a data packet transmitted to the client device to the time that the packet is received. In another example, the client device may return an acknowledgement message to the content server for a particular content packet, which the content server may utilize to calculate an estimated latency value for providing data to the client device. Further, in operation 410, the content server receives an advertised congestion window from the client device, described above in the acknowledgement message 210 transmitted to the content server in FIG. 2A.

With the obtained features of the content file, the estimated latency to the client device, and the available congestion window of the client device, the content server may calculate and set an initial CWND value based on one or more calculations in operation 412. In particular, the content server may calculate a minimum CWND value needed to provide the content to the client device to meet the content file features and set the initial CWND value accordingly. Further, the content server may control the adjustment of the CWND value in a similar manner based on the calculations. Further still, the content server may determine that, based on the client device characteristics and the estimated latency, the content cannot be provided to the client within the specifications of the content file. In such a circumstance, the content server may notify the client device and/or a network administrator accordingly.

In one particular example for live video, it may improve the user's experience receiving the content file if the startup time for the video is reduced. To reduce the startup time, the buffer window and the possible bitrate of the client device may be determined and, if the client device can process a high bitrate and/or has a large buffer, a relatively large initial CWND value may be set by the content server. This high initial CWND value may provide an initial blast of content data to the client device to get the live video started quickly. In another example, when the content server determines that the video stream cannot be supported by the client device or there is too much congestion on the connection to provide the content at the specifications of the video, the content server notifies the client device. This notification may occur prior to the client device emptying its buffer so that the client device may adjust the playback of the data accordingly and there is no interruption to the content presentation. The adjustment of the CWND may also be based on these calculations to ensure that congestion on the connection is likely to not impede the transmission of the content data to the client device.

In another embodiment, the content server, upon determining that a video stream cannot be supported by the client device or that there is too much congestion on the connection to provide the content at the specifications of the video, may provide alternative content (perhaps at a lower bitrate) to the client device. Conversely, if it is determined that the network and client device may support a higher rate, a higher bit rate file may be substituted in the session and provided to the client device.

Figure 5:
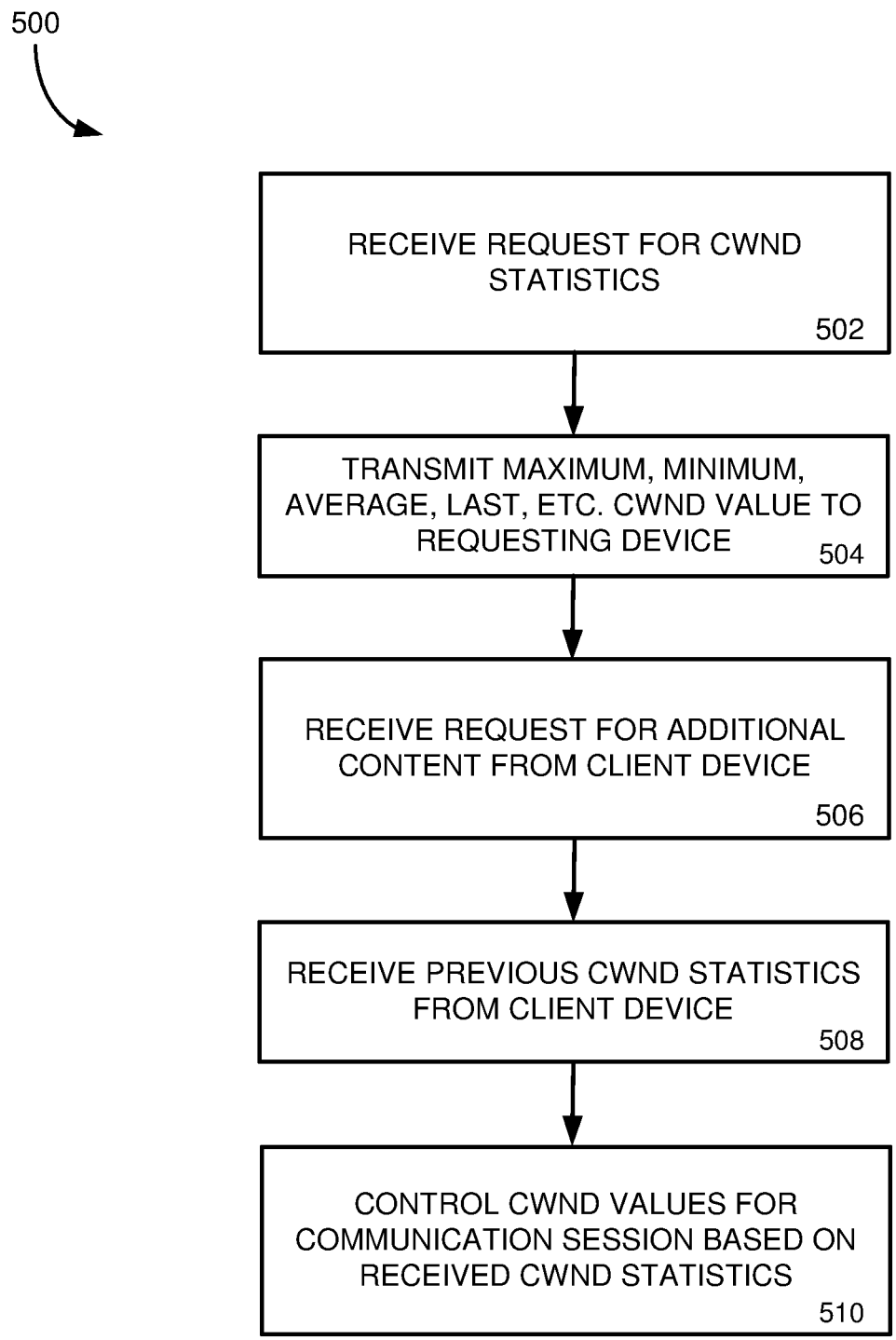
FIG. 5 is a flowchart of a method for utilizing congestion window value statistics and transmission rate information to provide content to a client of a content delivery network.

In yet another embodiment, one or more CWND statistics for the communication session (or multiple communication sessions) may be provided to the client device for use in other requests for content. For example, FIG. 5 is a flowchart of a method 500 for utilizing congestion window value statistics and transmission rate information to provide content to a client of a content delivery network. The CWND statistics and transmission rate information may be provided by a content server (or other device or devices of the network) to the client device and stored by the client device. As such, the operations of the method 500 may be performed by a content device or other network device or combination of devices of a CDN.

Beginning in operation 502, the content server receives a request from a client device for CWND statistics at the end or near the end of a communication session between the devices. The request for the CWND statistics may be included in a header of a packet message transmitted between the devices or may be included as a separate request to the content server. In response, the content server may transmit the CWND statistics calculated by the content server. For example, the content server may maintain running statistics on the CWND values of the communication session with the client device. Certain aspects of the calculated statistics may be of particular use by the client device, such as a maximum CWND value reached during the session, a minimum CWND value, an average CWND value, the last CWND value of the session, and the like. In general, any information about the CWND values utilized during the communication session may be gathered and provided by the content server. In some implementations, the content server may send the actual statistical data, encrypted statistical data, or a lookup key used to retrieve store statistical information from a database. As such, in operation 504 one or more of the calculated values may be transmitted to the client device.

As mentioned above, the client device may store the received CWND statistics. In some instances, this information may also be utilized by the client device when requesting additional content from the content server or from another content server of the CDN or another CDN. To utilize the CWND statistic information, the client device may transmit a request for additional or new content data from the content server such that the content server receives the request in operation 506. It should be appreciated that the content server that receives the request for additional content may be the same content server that provided the CWND statistics to the client device or may be another content server (or any other network device). Further, the client device may also provide the stored CWND statistics from the previous communication session to the content server in operation 508. In one particular embodiment, the content server may request the CWND statistics from the client device once a request for content is received, such as through a GETSTAT command or request. Further and as explained in more detail below, the content server may utilize the CWND statistics received to set and control the CWND for the communication session with the requesting client device in operation 510.

In general, the content server may utilize the CWND statistics from a previous communication session to gain some information about the requesting client device and possible congestion between the communicating devices and/or control the CWND values during the session. For example, the content server may set the initial CWND value for transferring content data to the client device at the last known CWND value or the minimum value to make it more likely that the first packets of content data are received by the client device. In another example, the content server may control the adjustment of the CWND value based on the statistics, such as quickly bringing the CWND to the received average CWND value. In yet another example, the content server may limit the rate the data is sent to the client device based on the received CWND statistics, regardless of the advertised bit rates from the client device.

Further, other information included in the CWND statistics may aid the content server in providing the requested data. For example, the CWND statistics provided by the client device may indicate timestamps, geographic locations, and/or device types of a previous content server from which the statistics are received. If, for example, the current content server determines that the information of the previous content server is substantially different than the current content server, the content server may disregard the statistics from the previous communication session. For example, if the previous content server was of a different type or is located in a vastly different geographic location, the received statistics may not apply to the current communication session. However, if the specifications of the previous content server are similar to the current content server, the CWND statistics may be considered and used during CWND control.

The CWND control of a content server of a CDN may also be utilized through the network. For example, one or more content servers of a CDN may attempt different schemes for controlling the CWND value during communication sessions with client devices. These schemes may be chosen randomly from a database of CWND schemes. The effectiveness of each scheme may be tracked by the content server and stored in a central database. Through the iterations of the schemes as applied by the various content servers of the CDN, the overall performance of the schemes may be understood and tracked by the CDN to maximize the effectiveness of providing the content to the client device. The application of one or more of the control schemes to the content servers of the CDN may be based on any criteria, such as speed or overall impact to the network on providing the content.

Through the systems and methods described above, the CWND value of a communication session may be set and controlled to provide a more efficient delivery of content to the client device. In particular, an initial CWND value may be set by a content server based on a type of content requested, rather than to a default value for the content server. Further, control of the CWND value during the communication session may be based on one or more CWND value statistics provided to the content server by the client device indicating a previous communication session. Through these schemes, the CWND value may be controlled by the content server more closely to maximize the efficiency (or based on another other performance or business rule) when providing content from a CDN to a client device.

Figure 6:
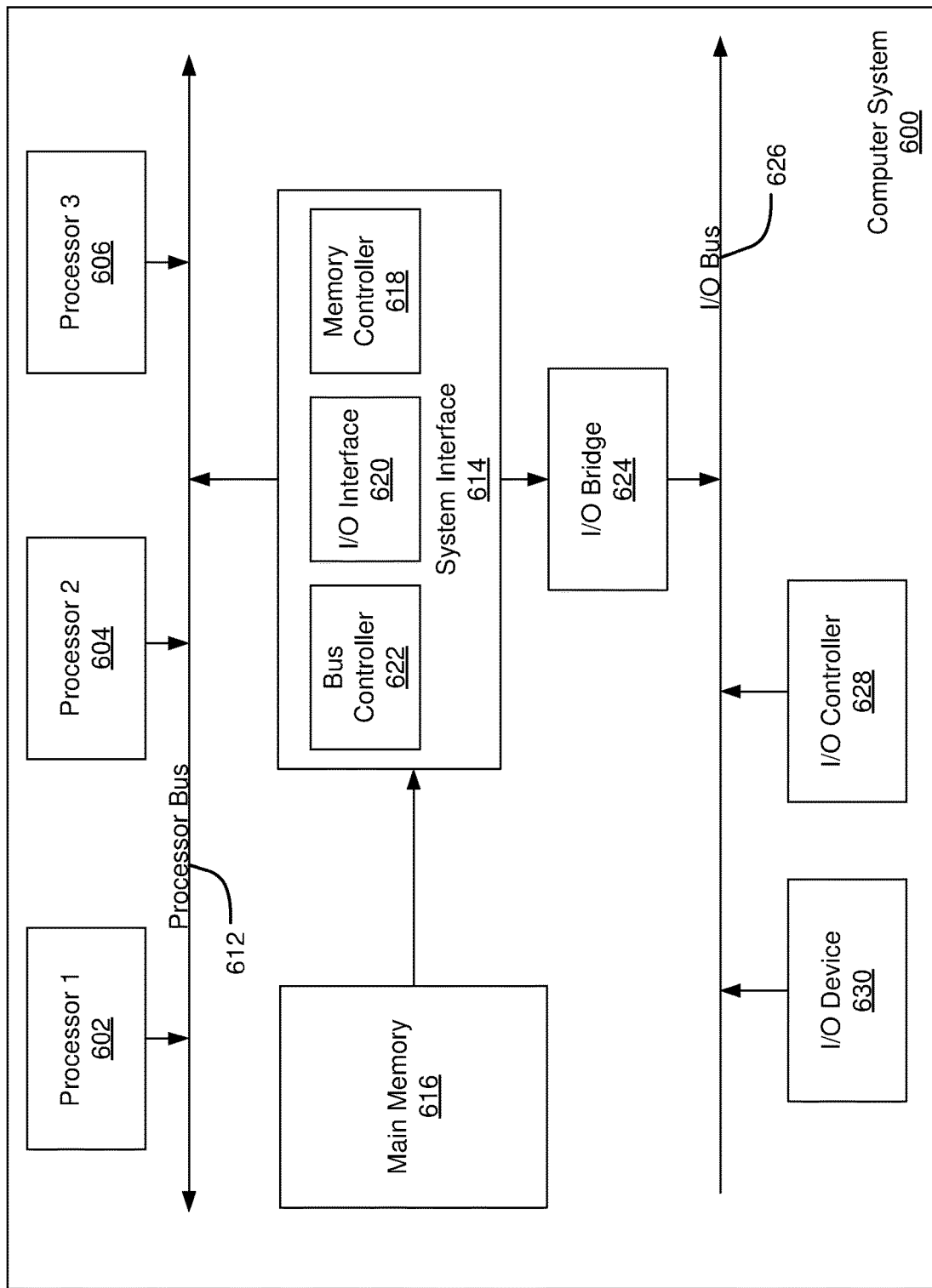
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the network disclosed above. In particular, the computing device of FIG. 6 is one embodiment of the server or other networking component that performs one of more of the operations described above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for servicing requests for content in a content delivery network (CDN), the method comprising:

setting, by a content server, an initial congestion window (CWND) value for a communication session between a client device and the content server for providing information to the client device;

receiving, by the content server from the client device, a request for the content, the request comprising an identification of the content, the identification of the content comprising a content file name included in the request for content;

determining, by the content server, a content type based on the identification of the content from a database of content information, in response to the request for the content, the content type comprising an indication of a file size of the requested content; and resetting, by the content server, the initial CWND value for the communication session between the client device and the content server based at least on the file size and the content file name.

2. The method of claim 1, further comprising:
detecting, by the content server, a congestion on a connection between the client device and the content server; and
adjusting, by the content server, the initial CWND value based on the detected congestion on the connection.

3. The method of claim 1, further comprising determining a content type associated with the requested content based at least on the content file name, wherein resetting the initial CWND value for the communication session between the client device and the content server is further based on the content type.

4. The method of claim 1, wherein the content type obtained from the database comprises an estimated urgency of receiving the requested content for the client device, wherein resetting the initial CWND value for the communication session between the client device and the content server is further based on the estimated urgency.

5. The method of claim 1, wherein the identification of the content comprises a requested bit rate for receiving the content from the content server at the client device.

6. The method of claim 1, further comprising:
receiving, by the content server, a request for CWND statistics from the client device comprising one or more calculated CWND values set by the content server during the communication session; and
transmitting, by the content server, the CWND statistics to the client device.

7. The method of claim 6, wherein the CWND statistics comprise at least one of a maximum CWND value, a minimum CWND value, an average CWND value, or a last of a CWND value.

8. A content delivery network (CDN) networking device comprising:
at least one communication port for receiving a request for content from a client device, the request comprising an identification of the content, the identification of the content comprising a content file name included in the request for content;
a processing device; and
a computer-readable medium connected to the processing device configured to store information and instructions that, when executed by the processing device, performs operations to:
set an initial congestion window (CWND) value for a communication session with the client device, the communication session to provide information to the client device;
access a database of content information to determine a content type of the requested content based at least on the identification of the requested content received from the client device, in response to the request for the content, the content type comprising an indication of a file size of the requested content;
reset the initial CWND value for the communication session with the client device based at least on the file size of the requested content and the content file name; and
provide a portion of the requested content to the client device over the at least one communication port based at least on the reset initial CWND value.

9. The CDN device of claim 8, wherein the processing device further performs operations to:
detect a congestion on a connection associated with the communication session; and
adjust the initial CWND value based on the detected congestion on the connection.

10. The CDN device of claim 8, wherein the processing device further performs operations of determining a content type associated with the requested content based at least on the content file name, wherein resetting the initial CWND value for the communication session with the client device is further based on the content type.

11. The CDN device of claim 10, wherein the processing device further performs operations to:
estimate a latency of providing the portion of the requested content to the client device, and
reset the initial CWND value according to the estimated latency and the content type to provide the portion of the requested content to the client device.

12. The CDN device of claim 8, wherein the content type determined from the database comprises an estimated urgency of receiving the requested content for the client device, wherein resetting the initial CWND value for the communication session with the client device is further based on the estimated urgency.

13. The CDN device of claim 8, wherein the identification of the content comprises a requested bit rate for receiving the content at the client device.

14. The CDN device of claim 8, wherein the processing device further performs operations to:
receive a request for CWND statistics from the client device comprising one or more calculated CWND values; and
transmit the CWND statistics to the client device.

15. The CDN device of claim 14, wherein the CWND statistics comprise at least one of a maximum CWND value, a minimum CWND value, an average CWND value, or a last of a CWND value.

* * * * *